United States Patent [19]

Honma et al.

[11] Patent Number: 4,955,463

[45] Date of Patent: Sep. 11, 1990

[54] WORK SUPPLYING SYSTEM TO MACHINE TOOLS

[75] Inventors: Eiichi Honma; Masakazu Hironaka; Masaki Miyanaka; Yutaka Ito; Kuniaki Ookuma; Yoshiteru Kamiyama, all of Sayama, Japan

[73] Assignee: Honda Giken Kogyo Kabushiki Kaisha, Tokyo, Japan

[21] Appl. No.: 348,919

[22] Filed: May 8, 1989

[30] Foreign Application Priority Data

May 12, 1988 [JP] Japan ................................ 63-115703
May 12, 1988 [JP] Japan ................................ 63-62566[U]

[51] Int. Cl.$^5$ .............................................. B65G 47/00
[52] U.S. Cl. ................................ 198/346.1; 198/409; 198/465.1; 29/33 P; 29/563; 29/564; 414/222; 414/782
[58] Field of Search ............... 414/222, 223, 225, 778, 414/782, 777; 198/346.1, 409, 465.1; 29/33 P, 38 C, 563, 564

[56] References Cited

U.S. PATENT DOCUMENTS

| 2,953,069 | 9/1960 | Smith | 29/38 C X |
| 4,285,233 | 8/1981 | Swis | 198/465.1 X |
| 4,637,108 | 1/1987 | Murata et al. | 198/465.1 X |
| 4,685,850 | 8/1987 | Ohta et al. | 414/223 X |
| 4,763,391 | 8/1988 | Yoshioka et al. | 29/33 P |

FOREIGN PATENT DOCUMENTS 0038386  3/1977  Japan ................................ 29/563

Primary Examiner—Robert J. Spar
Attorney, Agent, or Firm—Armstrong, Nikaido, Marmelstein, Kubovcik & Murray

[57] ABSTRACT

A work supplying system for conveying work attached to a pallet to a plurality of machine stations disposed around an imaginary center line iin a circumferential direction, and a work conveying and delivering unit for conveying the work to the work conveyor and delivering the work from the work conveyor, wherein a conveying and delivering station is disposed for conveying and delivering the work attached to the pallet, and a plurality of releasable stations are disposed corresponding to respective machine stations for machining the work, and are located on linear lines connecting the imaginary center line to the respective machining stations, and the conveying and delivering station and the releasable stations are installed around the imaginary center line at circumferentially equal intervals along an imaginary circle which has a center on the imaginary center line, the work conveyor comprising a post stand with an axis thereof aligned with the imaginary center line, slide units each reciprocatively movable between the associated releasable station and machining station, a plurality of stationary guide rails extending in a circular-arc shape along the imaginary circle at portions except the conveying and delivering station and the releasable stations, movable guide rails disposed on the slide units and extending in a circular-arc shape at portions corresponding to the conveying and delivering station and the respective releasable stations so as to be connectible to the stationary guide rails to form cooperatively with the stationary guide rails annular guide rails for guiding angular displacement of the pallet around the post, and an index arm supported on the post angularly displaceably for releasable connection to the pallet on the annular guide rails.

13 Claims, 13 Drawing Sheets

4,955,463

WORK SUPPLYING SYSTEM TO MACHINE TOOLS

BACKGROUND OF THE INVENTION

1. Field of the Invention

The field of the invention is a work supplying system to machine tools, having a work conveyor for sequentially conveying a work attached to a pallet to a plurality of machine tools disposed around an imaginary center line at intervals in a circumferential direction, and a work conveying and delivering unit for conveying the work to the work conveyor and delivering the work from the work conveyor 2. Description of the Prior Art Such a work supplying system is conventionally known from Japanese Patent Application No. 284365/86.

In the above conventional work supplying system, however, a plurality of machining stations are installed at equal circumferential intervals on the way of rails formed in a circular arc shape, the work is positioned at the respective machining stations, and machine tools or tools disposed around the rails are advanced toward the work for machining thereof. However, according to such work supplying system, the machine tools or the tools can horizontally machine the work, but the rails may disturb the machine tool in vertical machining like a boring machine having a boring bar extending vertically, making the machining operation difficult.

SUMMARY OF THE INVENTION

The present invention has been accomplished with such circumstances in view, and it is an object of the present invention to provide a work supplying system to machine tools, wherein a work is conveyed to a plurality of machine tools and can be machined irrespective of the kinds of machining to be carried out by the machine tools.

In order to achieve the above object, according to the present invention, there is provided a work supplying system to machine tools, having a work conveyor for sequentially conveying a work attached to a pallet to a plurality of machine tools which are disposed around an imaginary center line at intervals in a circumferential direction, and a work conveying and delivering unit for conveying the work to the work conveyor and delivering the work from the work conveyor, wherein a conveying and delivering station is disposed for conveying and delivering the work attached to the pallet, and a plurality of releasable stations are disposed corresponding to respective machining stations, which are settled corresponding to the machine tools for machining the work, and are located on linear lines connecting the imaginary center line to the respective machining stations, and said conveying and delivering station and said releasable stations being installed around the imaginary center line at circumferentially equal intervals along an imaginary circle which has a center on the imaginary center line, the work conveyor comprising a post stand with an axis thereof aligned with the imaginary center line, slide units each reciprocatively movable between the associated releasable station and machining station, a plurality of stationary guide rails extending in a circular-arc shape along the imaginary circle at portions except the conveying and delivering station and the releasable stations, movable guide rails disposed on the slide units and extending in a circular-arc shape at portions corresponding to said conveying and delivering station and the respective releasable stations so as to be connectible to the stationary guide rails to form cooperatively with the stationary guide rails an annular guide rails for guiding an angular displacement of said pallet around the post, and an index arm supported on the post angularly displaceably for releasable connection to the pallet on the annular guide rails.

Owing to the arrangement described above, the pallet attached with the work is conveyed to or delivered from the annular guide rail at the conveying and delivering station, and the pallet which has been conveyed to the annular guide rail is then conveyed on the annular guide rail by the index arm, and the pallet is separated from the annular guide rail to move between the releasable station and the machining station in response to the slide unit moving between the releasable station and the machining station. Therefore, each machine tool can perform machining of the work at the machining station distanced from the annular guide rail so that the annular guide rail does not disturb the machining and any kinds of machining can be effected to the work.

The above and other objects, features and advantages of the invention will become apparent from reading of the following description taken in conjunction with the accompanying drawings.

BRIEF DESCRIPTION OF THE DRAWINGS

Drawings illustrate one embodiment of the present invention, wherein.

DESCRIPTION OF THE PREFERRED EMBODIMENT

The present invention will now be described by way of one embodiment with reference to the accompanying drawings.

Figure 1:
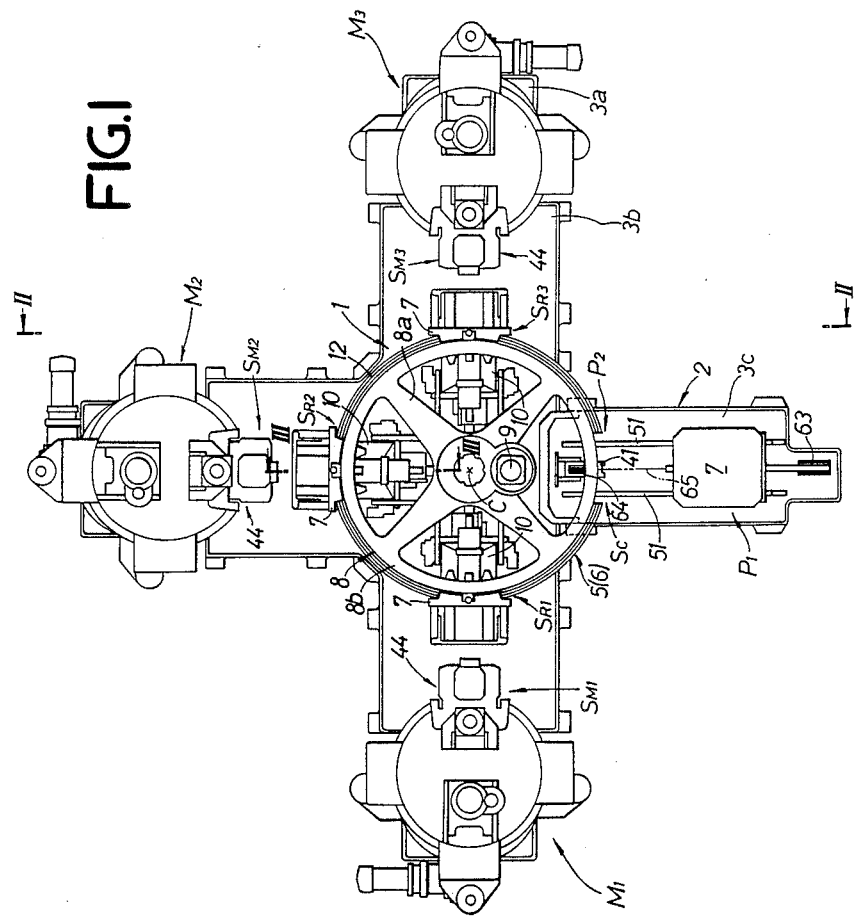
FIG. 1 is a plan view showing the entire arrangement of the embodiment.
Figure 2:
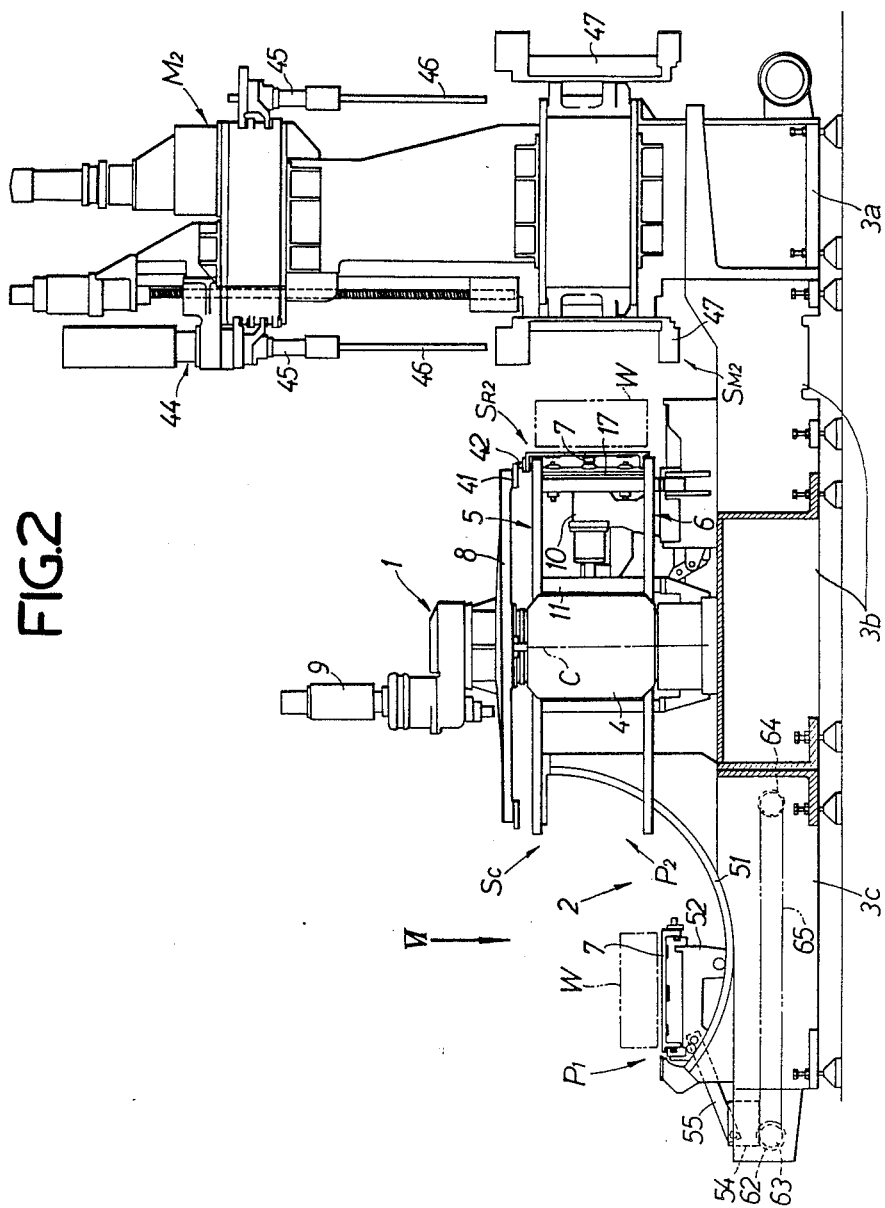
FIG. 2 is a sectional view taken along a line II—II of FIG. 1.

Referring first to FIGS. 1 and 2, a plurality of, e.g., three first, second and third machine tools $M_1$, $M_2$ and $M_3$ are disposed at intervals around an imaginary center line C, a work W, for example, of a cylinder block in an engine to be sequentially machined by these machine tools $M_1$, $M_2$ and $M_2$ is successively conveyed to the respective machine tools $M_1$, $M_2$ and $M_3$ by a work conveyor 1, and the work W is conveyed to and delivered from the work conveyor 1 through a work conveying and delivering unit 2.

The machine tools $M_1$, $M_2$ and $M_3$, the work conveyor 1 and the work conveying and delivering unit 2 are respectively disposed on stationary bases 3a, 3b and 3c. First, second and third machining stations $S_{M1}$, $S_{M2}$ and $S_{M3}$ individually corresponding to the machine tools $M_1$, $M_2$ and $M_3$ for machining the work W are settled around the imaginary center line C set on the stationary base 3b. First, second and third releasable stations $S_{R1}$, $S_{R2}$ and $S_{R3}$ disposed on linear lines connecting the machining stations $S_{M1}$, $S_{M2}$ and $S_{M3}$ and the imaginary center line C, and a conveying and delivering station $S_C$ are installed at equal intervals in a circumferential direction along an imaginary circle having its center on the imaginary center line C.

Figure 3:
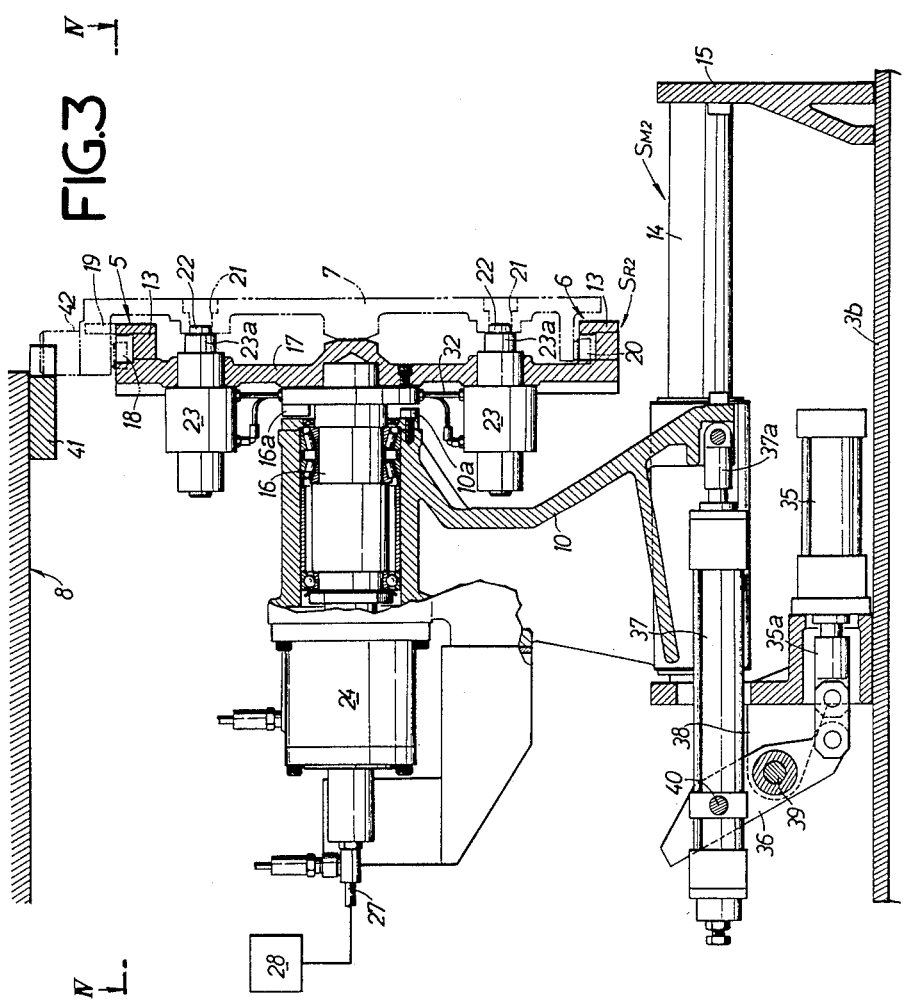
FIG. 3 is an enlarged sectional view taken along a line III—III of FIG. 1.
Figure 4:
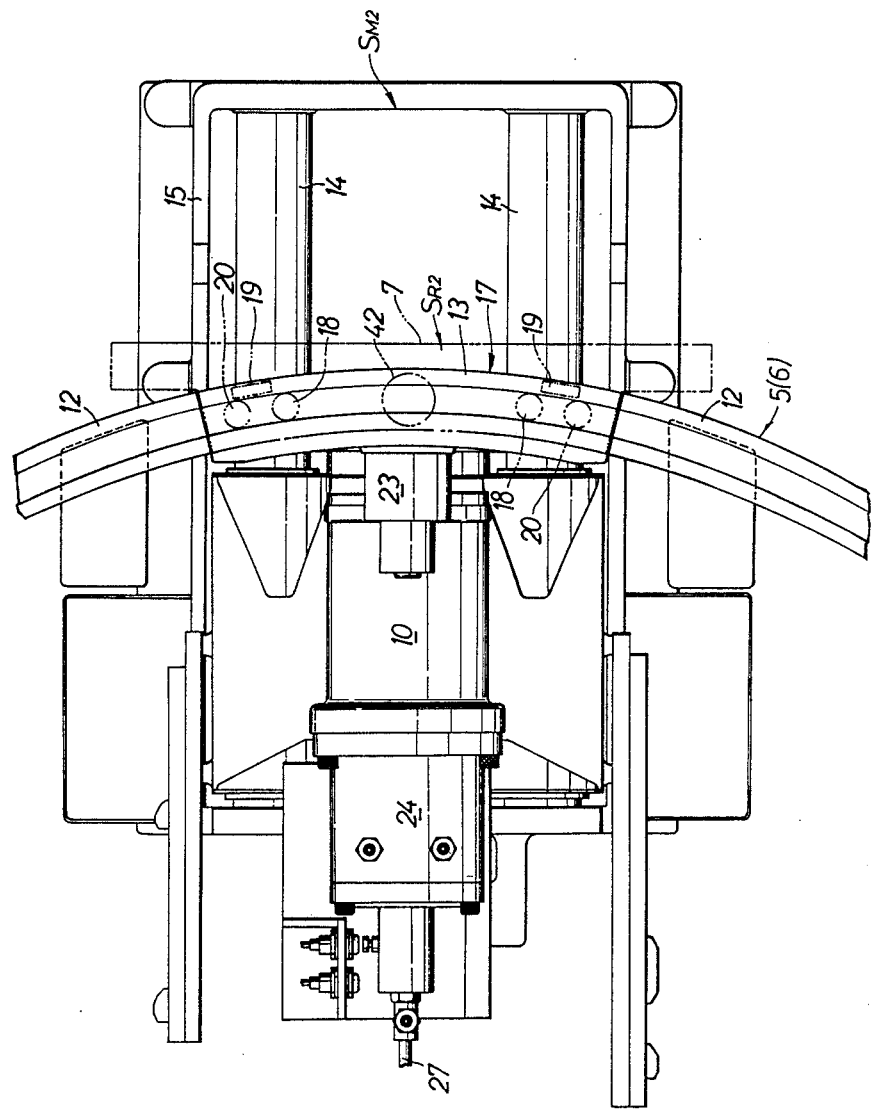
FIG. 4 is a view taken along a line IV—IV of FIG. 3.

Referring also to FIGS. 3 and 4, the work conveyor 1 comprises a post 4 stood on the stationary base 3b with its axis aligned with the imaginary center line C, a pair of upper and lower annular guide rails 5 and 6 formed annularly along an imaginary circle passing the first, second and third releasable stations $S_{R1}$, $S_{R2}$ and $S_{R3}$ and the conveying and delivering station $S_C$, an index arm 8 supported on the post 4 for an angular displacement to be engaged with a pallet 7 disposed over the annular guide rails 5 and 6, an index driving motor 9 provided at the upper end of the post 4 to drive the index arm 8 for an angular displacement, and three slide units 10 for conveying the pallet 7 between the first, second, third releasable stations $S_{R1}$, $S_{R2}$, $S_{R3}$ and the first, second and third machining stations $S_{M1}$, $S_{M2}$, $S_{M3}$.

Both the annular guide rails 5 and 6 are disposed at a vertical) interval, and each comprises a plurality of stationary guide rails 12 formed in a circular-arc shape along the imaginary circle at portions except the conveying and delivering station $S_C$ and the respective releasable stations $S_{R1}$, $S_{R2}$ and $S_{R3}$ and fixedly secured to a supporting frame 11 stood on the stationary base 3b, and a plurality of movable guide rails 13 formed in a circular-arc shape at portions corresponding to the conveying and delivering station $S_C$ and the releasable stations $S_{R1}$, $S_{R2}$ and $S_{R3}$ so as to be aligned with the stationary rails. Further, the annular guide rails 5 and 6 are each formed in its lateral sectional shape so as to become a U shape opened upwardly.

A pair of guide rods 14 and 14 are horizontally fixed in parallel with each other to a rectangular supporting frame 15 fixedly secured onto the stationary base 3b over between the first, second and third releasable stations $S_{R1}$, $S_{R2}$ and $S_{R3}$ and the first, second and third machining stations $S_{M1}$, $S_{M2}$ and $S_{M3}$. The guide rods 14 and 14 are slidably engaged with the lower portion of the slide unit 10, and the slide unit 10 is guided by both the guide rods 14 and 14 to reciprocate between the first, second and third releasable stations $S_{R1}$, $S_{R2}$ and $S_{R3}$ and the first, second and third machining stations $S_{M1}$, $S_{M2}$ and $S_{M3}$. A rotatably driving shaft 16 parallel to the guide rods 14 and 14 is rotatably supported to the upper portion of the slide unit 10. A pallet supporting plate 17 is fixedly secured to the side ends of the machining stations $S_{M1}$, $S_{M2}$ and $S_{M3}$ of the rotatably driving shaft 16, and the movable guide rails 13 and 13 are fixedly secured to both the upper and lower ends of the pallet supporting plate 17. Accordingly, the pallet supporting plate 17 is travellably reciprocated together with the slide unit 10, and rotated in response to the rotating operation of the rotatably driving shaft 16. The rotatably driving shaft 16 is coaxially connected to a rotatably driving motor 24 disposed fixedly to the upper portion of the slide unit 10. Further, stoppers 16a and 10a for restricting the rotation of a rotary amount, for example, 180° set at the rotatably driving shaft 16 for contacting are provided at the rotatably driving shaft 16 and the slide unit 10, respectively.

The pallet 7 can move along the annular guide rails 5 and 6 in a state for supporting the work W. A pair of guide rollers 18 and 18 having a vertical axis to roll in the upper annular guide rail 5 and a pair of guide rollers 19 and 19 having a horizontal axis to roll on the annular guide rail 5 are supported at an circumferential interval of the annular guide rail 5 to the upper portion of the pallet 7, and a pair of guide rollers 20 and 20 having a horizontal axis to roll in the lower annular guide rail 6 are supported at the circumferential interval of the annular guide rail 6 to the lower portion of the pallet 7.

Two positioning holes 21 and 21 opened at an elevational interval in a state supported to the pallet supporting plate 17 at the releasable stations $S_{R1}$, $S_{R2}$ and $S_{R3}$ at the movable guide rails 13 and 13 as the parts of the annular guide rails 5 and 6 are perforated at the pallet 7, and positioning pins 22 and 22 are so disposed detachably to the pallet supporting plate 17 as to be engaged with the positioning holes 21 and 21, respectively. These positioning pins 22 and 22 are coaxially connected to pistons 23a, 23a of a pair of cylinders 23 and 23 fixedly supported to the pallet supporting plate 17 at an axis parallel to the rotatably driving shaft 16.

The detailed structure of the pallet 7 will be described later with respect to FIGS. 10 and 11 for explaining the work conveying and delivering unit 2.

Figure 5:
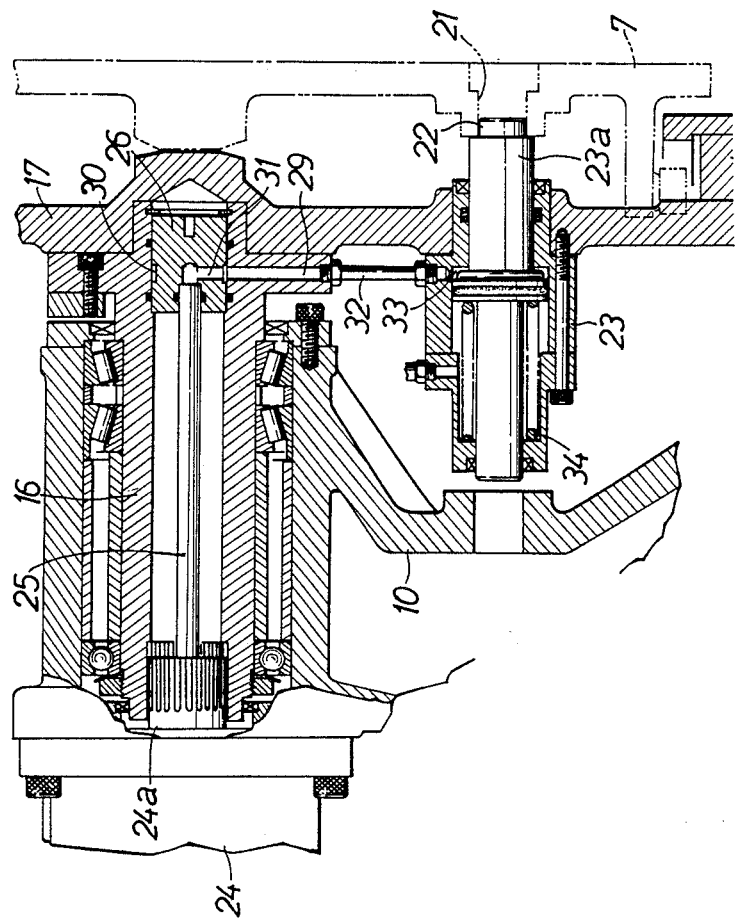
FIG. 5 is an enlarged longitudinal sectional view of an essential portion of FIG. 3.

Referring to FIG. 5, the rotatably driving shaft 16 is formed in a hollow cylindrical shape, the base end of the rotatably driving shaft 16 is spline-coupled to the output shaft 24a of a rotatably driving motor 24, and the end of the rotatably driving shaft 16 is engaged with a short cylindrical connecting member 26 to be closed. On the other hand, a fluid pressure supply conduit 25 coaxially penetrating the output shaft 24a is coaxially disposed within the rotatably driving shaft 16, one end of the fluid pressure supply conduit 25 is coaxially connected to the connecting member 26, a connecting conduit 27 is connected to the other end of the fluid pressure supply conduit 25 through a rotary joint, not shown, and the connecting conduit 27 is connected to a hydraulic pressure supply source 28. An oil passage 29 extending radially of the end of the rotatably driving shaft 26 protruding from the slide unit 10 is provided at the end of the rotatably driving shaft 16, an annular groove 30 always communicating with the oil passage 29 is formed on the outer surface of the connecting member 26, and a communication passage 31 communicating between the fluid pressure supply conduit 25 and the annular groove 30 is perforated. Further, one end of a connecting conduit 32 is connected to the outer end of the oil passage 29, and the other end of the connecting conduit 32 is connected to hydraulic pressure chambers 33 of the cylinders 23 and 23. Accordingly, the hydraulic pressure is easily supplied also to the cylinders 23 and 23 for rotation together with the rotatably driving shaft 16.

Further, both the cylinders 23 and 23 are urged by a spring 34 in a direction for protruding the piston rods 23a and 23a to retreat the piston rods 23a and 23a when the hydraulic pressure is supplied to the hydraulic pressure chambers 33 to retract the positioning pins 22 and 22 from the positioning holes 21 and 21. Thus, in the state that the positioning pins 22 and 22 are engaged with the positioning holes 21 and 21 without supplying the hydraulic pressure to the cylinders 23 and 23, the pallet 7 of the state rising on the upper and lower movable guide rails 13 and 13 through the guide rollers 18, 19 and 20 is not fluctuated by the rotation of the pallet supporting plate 17 due to the rotating operation of the rotatably driving shaft 16. When the hydraulic pressure is supplied to the hydraulic pressure chambers 33 of the cylinders 23 and 23 to retract the positioning pins 22 and 22 from the positioning holes 21 and 21, the pallet 7 is moved along the annular guide rails 5 and 6.

The slide unit 10 is driven to be advanced by a shift cylinder 35 fixedly disposed on the stationary base 3b, a link 36 rockably supported at its intermediate portion to a bracket 38 fixedly secured to the supporting frame 15 and connected at its one end with the piston rod 35a of the shift cylinder 35, and a unit feeding cylinder 37 connected to the other end of the link 36 for connecting the piston rod 37a to the slide unit 10. The shift cylinder 35 is fixedly supported to the supporting frame 15 at an axis parallel to both the guide rods 14 and 14, and the piston rod 35a of the shift cylinder 35 protrudes from the supporting frame 15 toward the post 4. The link 36 is rockably supported to the bracket 38 through a horizontal axis 39 perpendicularly crossing the axes of both the guide rods 14 and 14, and the piston rod 35a is connected to one end, i.e., the lower end of the link 36. Further, the unit feeding cylinder 37 is disposed approximately parallel to the guide rods 14 and 14 above the shift cylinder 35, and the unit feeding cylinder 37 is connected to the other end of the link 36 through a trunnion shaft 40.

The extending and retreating amounts of the shift cylinder 35 are set to smaller values than those of the unit feeding cylinder 37, the slide unit 10 is disposed at the releasable stations $S_{R1}$, $S_{R2}$ and $S_{R3}$ in which the movable guide rails 13 and 13 are at parts of the annular guide rails 5 and 6 in the state that both the cylinders 35 and 37 are retreated, and the slide unit 10 separates the movable guide rails 13 and 13 from the stationary guide rail 12 in response to the maximum limit extending operation of the shift cylinder 35 to advance at a predetermined distance toward the machining stations $S_{M1}$, $S_{M2}$ and $S_{M3}$. Then, the unit feeding cylinder 37 is extended to advance the slide unit 10 to the machining stations $S_{M1}$, $S_{M2}$ and $S_{M3}$.

The index arm 8 is formed by connecting the ends of a plurality of, for example, four arms 8a extending radially to be rotatably supported at its base to the post 4 by the annular connecting portion 8b, and an approximately U-shaped connecting portion 41 opened radially outwardly for detachably engaging with the pallet 7 is fixedly secured at four portions of the connecting portion 8b at circumferential intervals. On the other hand, a connecting pin 42 to be engaged with the connecting portion 41 protrudes from the center of the upper end of the pallet 7 of the state supported to the pallet supporting plate 17. Accordingly, when the connecting pin 42 is engaged with the connecting portion 41, the index arm 8 is rotatably driven to displace the pallet 7 around the post 4 along the annular guide rails 5 and 6 for angular displacement.

The machine tools $M_1$, $M_2$ and $M_3$ are, for example, boring machines, and each comprises a drive mechanism 44 elevationally movable at positions corresponding to the machining stations $S_{M1}$, $S_{M2}$ and $S_{M3}$, a plurality of tool heads 45 detachably fixed to the lower portion of the drive mechanism 44 for selectively switching, a boring bar 46 extending downwardly by detachably connecting at its upper end to the tool head 45, and a plurality of supporting jigs 47 fixed by selectively switching at the positions corresponding to the machining stations $S_{M1}$, $S_{M2}$ and $S_{M3}$, and the work W supported by the supporting jig 47 corresponding to the machining stations $S_{M1}$, $S_{M2}$ and $S_{M3}$ is bored by the boring bar 46 selected corresponding to the work W.

The work conveying and delivering unit 2 is connected at its conveying and delivering station $S_C$ to the work conveyor 1, the work W attached to the pallet 7 is conveyed to the conveying and delivering station $S_C$ of the work conveyor 1 from the work conveying and delivering unit 2, and the work W machined by the machine tools $M_1$, $M_2$ and $M_3$ is delivered together with the pallet 7 from the conveying and delivering station $S_C$ by the work conveying and delivering unit 2.

Figure 6:
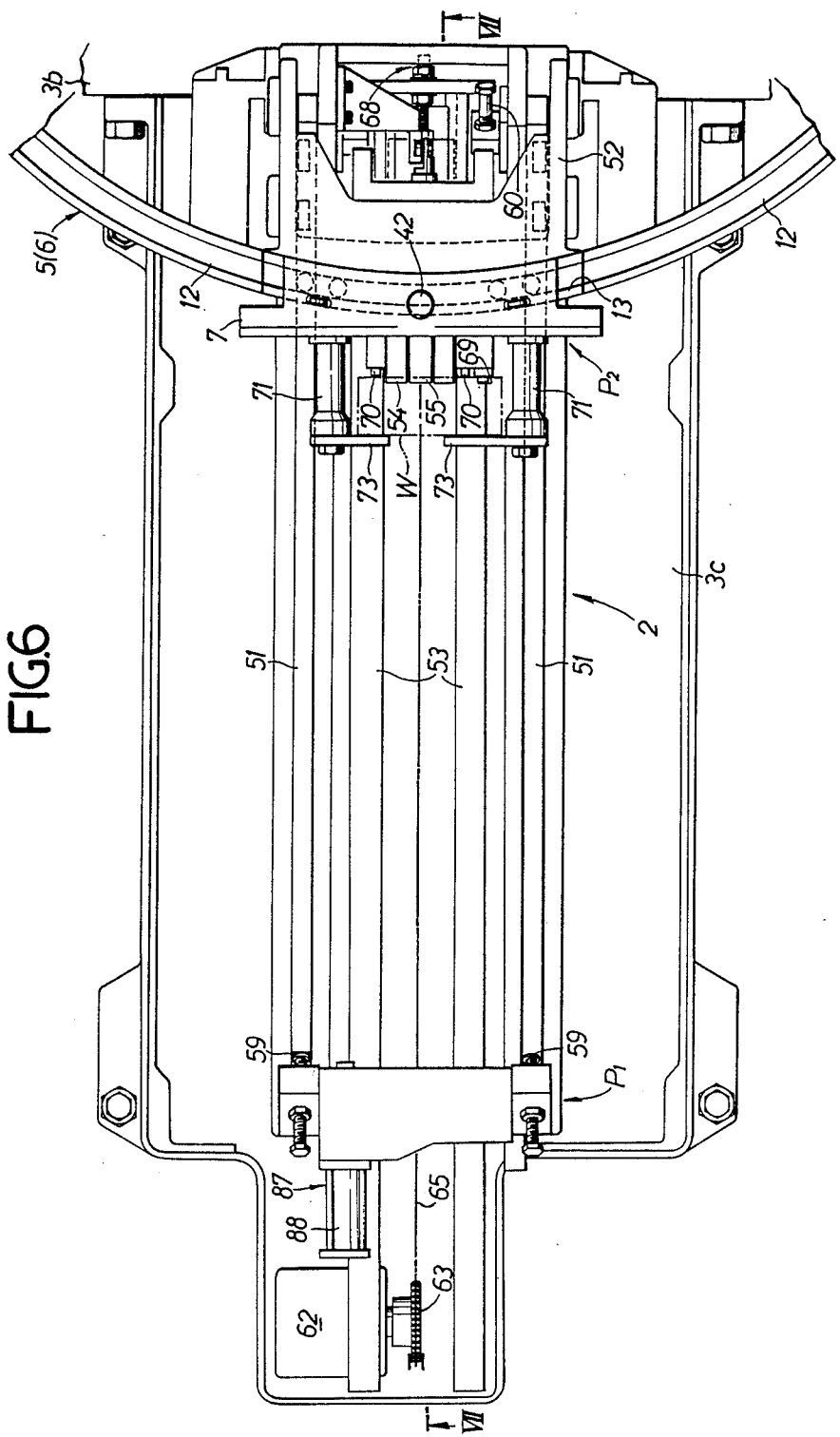
FIG. 6 is an enlarged view taken in a direction indicated by an arrow VI of FIG. 2.
Figure 7:
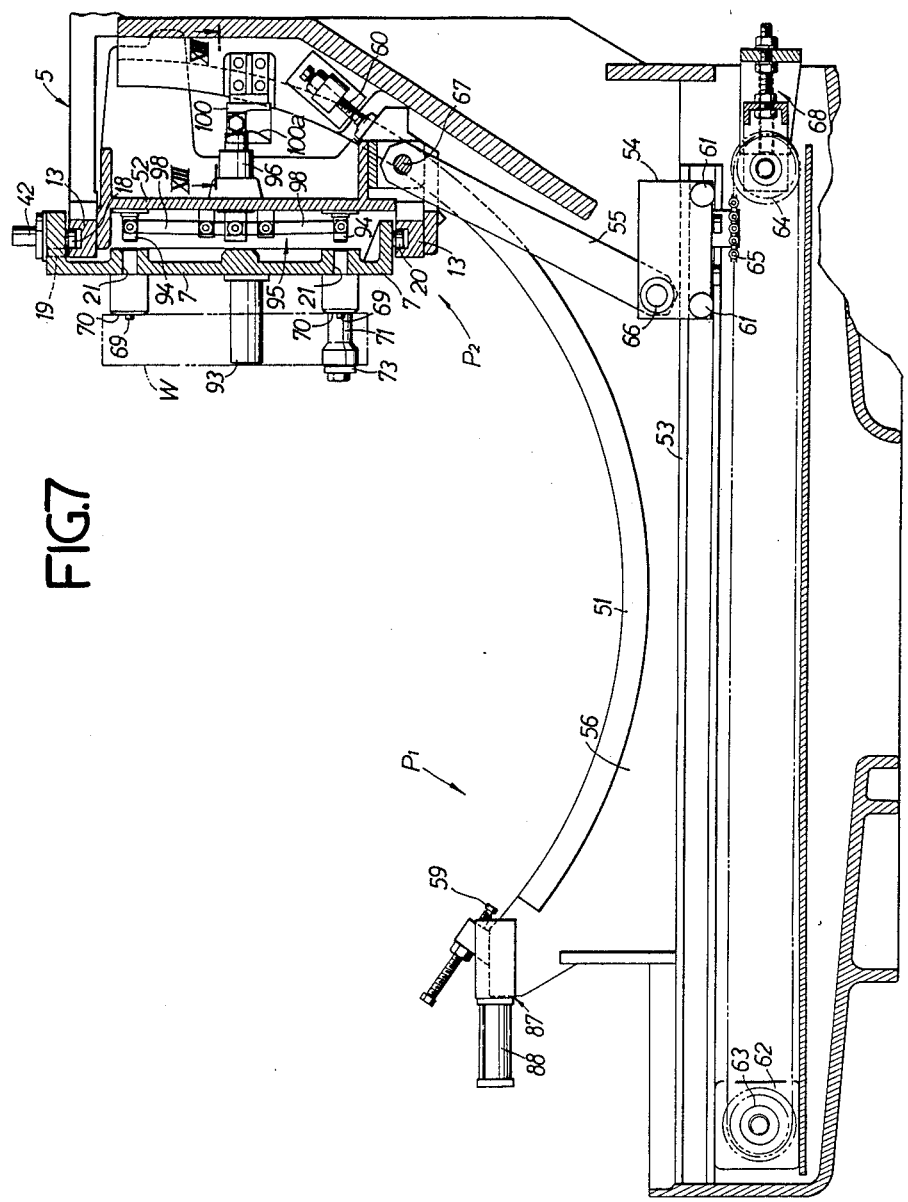
FIG. 7 is a sectional view taken along a line VII—VII of FIG. 6.
Figure 8:
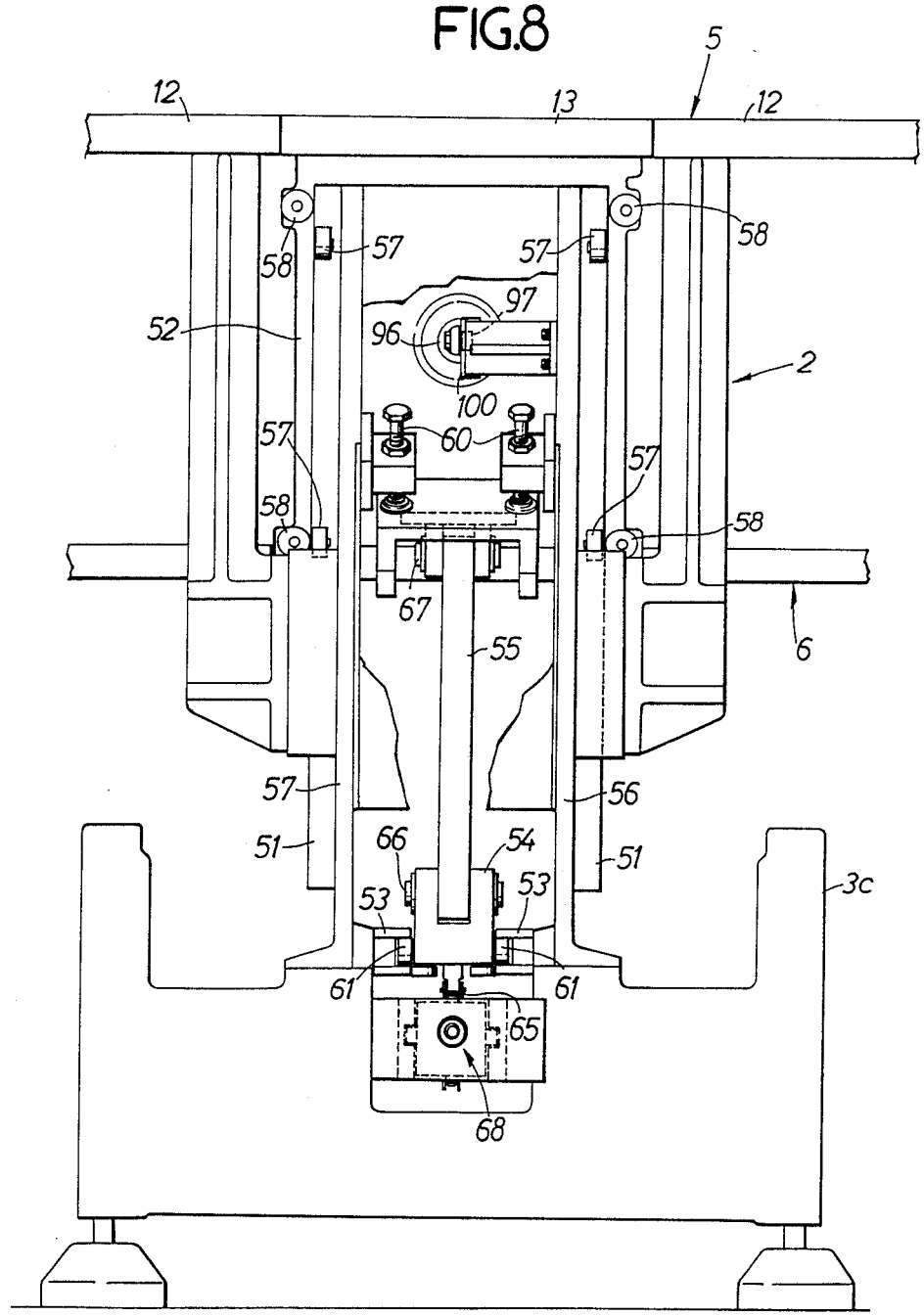
FIG. 8 is a partially cutaway side view taken in a direction from the left sides of FIGS. 6 and 7.

Referring also to FIGS. 6, 7 and 8, this work conveying and delivering unit 2 is provided over between the attaching and detaching position $P_1$ for attaching and detaching the work W to the pallet 7 of horizontal attitude and an attitude converting position $P_2$ for converting the pallet 17 attaching the work W to convey to and deliver from the work conveying unit 1 of the pallet 7 to a vertical attitude. The attitude converting position $P_2$ is set to the conveying and delivering station $S_C$ of the work conveyor 1, and the attaching and detaching position $P_1$ is set in space outwardly at a predetermined distance from the attitude converting position $P_2$ along the radial direction of the pot 4 of the work conveyor 1. Further, the attitude converting position $P_2$ is so set as to dispose the pallet 7 in height corresponding to the work machining positions of the machine tools $M_1$, $M_2$ and $M_3$, and the attaching and detaching position $P_1$ is set to the lower position than the attitude converting position $P_2$.

The work conveying and delivering unit 2 comprises a pair of right and left attitude converting guide rails 51 and 51 disposed fixedly on the stationary base 3a and formed in a circular-arc shape between the attaching and detaching position $P_1$ and the attitude converting position $P_2$, a supporting base 52 for supporting the pallet 7 from behind its back portion and movable along both the attitude converting guide rails 51 and 51, a pair of traveling guide rails 53 and 53 laid in parallel on the stationary base 3c between both the attitude converting guide rails 51 and 51, a traveling block 54 travellably disposed along both the traveling guide rails 53 and 53, and a connecting arm 55 for connecting the traveling block 54 to the supporting base 52 to move the supporting base 52 along the attitude converting guide rails 51 and 51 upon traveling of the traveling block 54.

Figure 9:
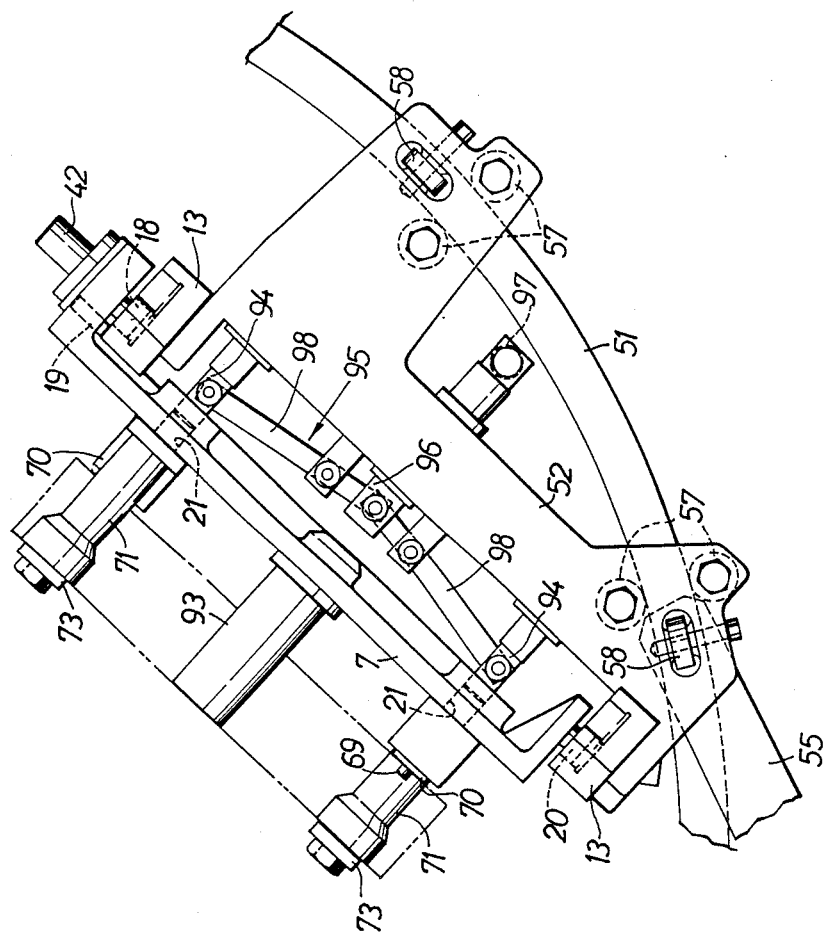
FIG. 9 is a side view of a pallet and a supporting base during moving on an intermediate portion of guide rails for converting an attitude.

The attitude converting guide rails 51 and 51 are fixedly secured on a pair of side plates 56 and 56 stood oppositely to each other on the stationary base 3c. As shown in Fig. 9, at the right and left of the supporting base 52 are disposed two sets of guide rollers 57 and 57 having an axis perpendicularly crossing the attitude converting guide rail 51 to hold the attitude converting guide rail 51 from above and below, and sole guide roller 58 having an axis perpendicularly crossing the guide roller 57 to slidably contact the outer surface of the attitude converting guide rail 51. The supporting base 52 is moved along the attitude converting guide rails 51 and 51 over between the attaching and detaching position $P_1$ and the attitude converting position $P_2$ by these guide rollers 57 and 57, thereby converting the attitude of the pallet 7 between the horizontal attitude and the vertical attitude.

A pair of horizontal stoppers 59 and 59 for restricting the movement of the side plates 56 and 56 in contact with the supporting base 52 are disposed at the sides corresponding to the attaching and detaching position P₁, and a pair of vertical stoppers 60 and 60 for restricting the movement of the side plates 56 and 56 in contact with the supporting base 52 are disposed at the side corresponding to the attitude converting position P₂. Further, the stoppers 59 and 59 are so disposed in the state in contact with the supporting base 52 as to dispose the supporting base 52, i.e., the pallet 7 in a horizontal attitude, and the vertical stoppers 60 and 60 are so disposed in the state in contact with the supporting base 52 as to dispose the supporting base 52 i.e., the pallet 7 in a vertical attitude. The movable guide rails 13 and 13 for forming parts of the annular guide rails 5 and 6 of the work conveyor 1 are fixedly secured to the supporting base 52 in the vertical attitude in contact with the vertical stoppers 60 and 60, and when the supporting base 52 is disposed in the vertical attitude, both the movable guide rails 13 and 13 are connected to the stationary guide rail 12 of the work conveyor 1.

The traveling block 54 is formed approximately in U shape opened upwardly over between both the traveling guide rails 53 and 53, and a pair of guide rollers 61 and 61 rolling along both the traveling guide rails 53 and 53 are supported to the traveling block 54 at both right and left side lower portions. The driving motor 62 is disposed at the attaching and detaching position P₁ on the stationary base 3c. A driving sprocket 63 is coaxially connected to the driving motor 62 between both the traveling guide rails 53 and 53, an endless chain 65 disposed between both the traveling guide rails 53 and 53 is engaged with a driven sprocket 65 and a driving sprocket 63 rotatably disposed at the attitude converting position P₂, and the chain 65 is engaged with the traveling block 65. Accordingly, the driving motor 62 is operated to travel the chain 65, thereby moving the traveling block 54 along both the traveling guide rails 53 and 53. Further, the driven sprocket 64 is supported to the stationary base 3c through an adjustor 68 for adjusting the tension degree of the chain 65.

One end of the connecting arm 55 is connected to the traveling block 54 through a connecting pin 66 horizontally crossing the traveling guide rails 53 and 53, and the other end of the connecting arm 55 is connected to the supporting base 52 through a connecting pin 67 parallel to the connecting pin 66. Accordingly, the supporting base 52 is moved along the attitude converting guide rails 51 and 51 in response to the horizontal movement of the traveling block 54 to convert its attitude.

Figure 10:
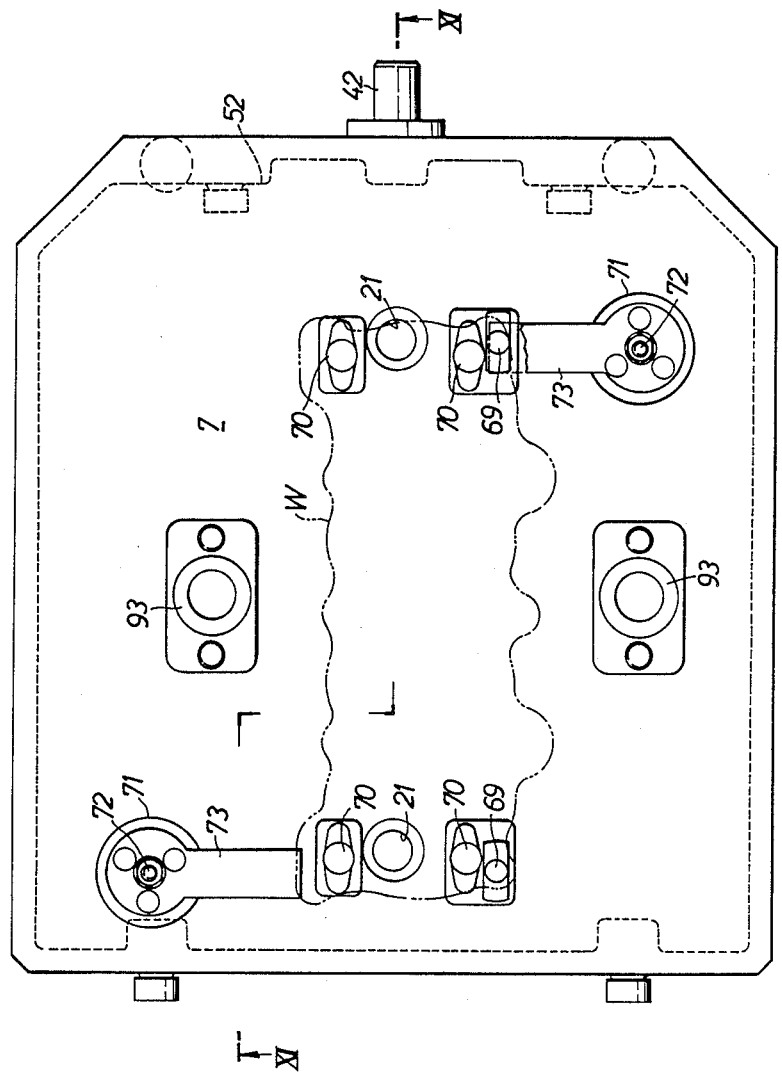
FIG. 10 is a plan view of the pallet.
Figure 11:
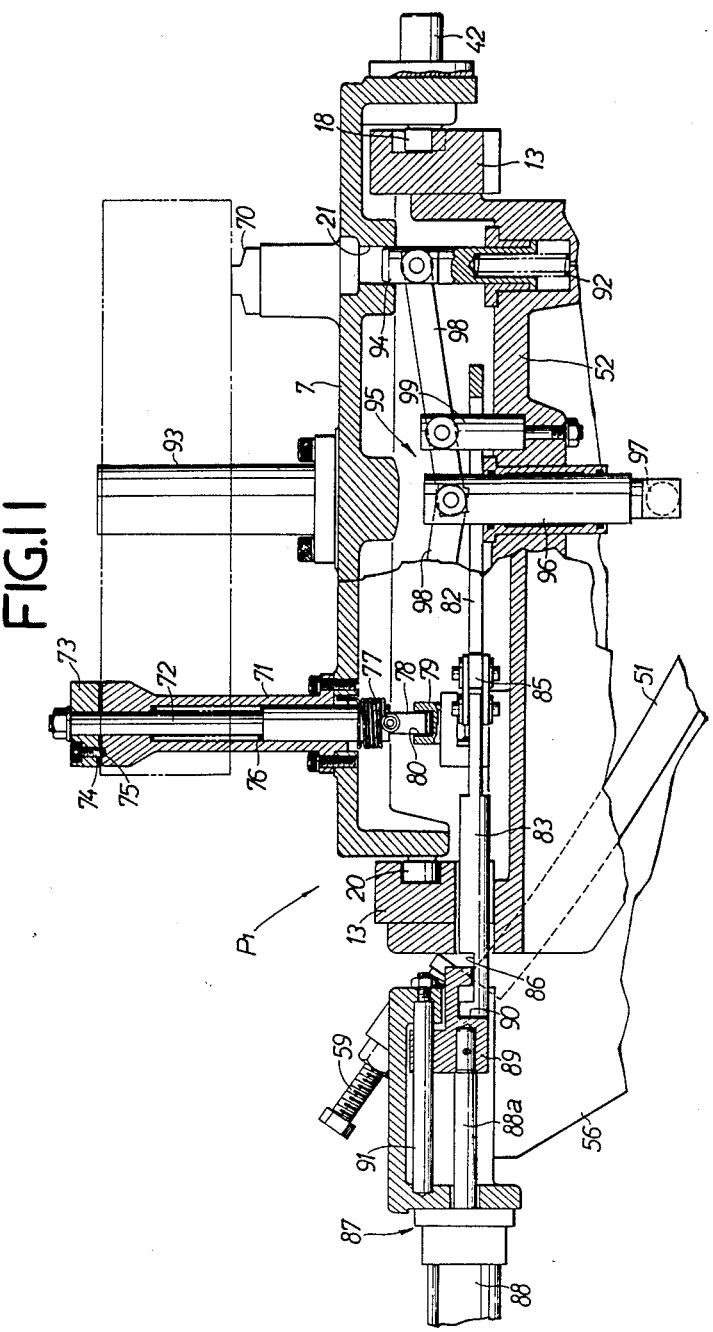
FIG. 11 is a longitudinal sectional view of the pallet and supporting base taken along a line XI—XI of FIG. 10.

Referring to FIGS. 10 and 11, the pallet 7 is fundamentally formed in a square or rectangular shape, and a plurality of, for example, four supporting protrusions 70 for placing the work W so protrude at the corners of the imaginary rectangular shape to interpose the positioning holes 21 between the two on the surface. Further, positioning protrusions 69 for positioning two of the supporting protrusions 70 adjacently in engagement with the pallet 7 protrude on the pallet 7. A pair of supporting cylinders 71 and 71 are stood on the pallet 7, and clamp rods 72 are axially movably and rotatably supported to the supporting cylinders 71 and 71. Clamp pawls 73 to be engaged with the work W placed on the protrusions 70 are fixedly secured to one end protruding from the supporting cylinder 71 of the clamp rod 72, and there is switched between the state that the work W is attached to the pallet 7 by the axial movement and the rotation of the clamp rod 72 and the state that the work W is releasable from the pallet 7. Further, a pair of guide posts 93 and 93 protrude on the pallet 7, and the guide posts 93 and 93 engage the positioning pins (not shown) provided at the machine tools M₁, M₂ and M₃ to perform the positioning functions to the machine tools M₁, M₂ and M₃ when the pallet 7 is conveyed to the machining stations S$_{M1}$, S$_{M2}$ and S$_{M3}$ by the work conveyor 1.

An engaging recess 75 for engaging the engaging pin 74 fixedly secured to the base of the clamp pawl 73 is formed at the upper end of the supporting cylinder 71, the clamp pawl 73 is engaged with the work W in the state the engaging pin 74 is engaged with the engaging recess 75, and the clamp rod 72 is so rotated as to release the engaging pin 74 from the engaging recess 75 to release the engaging state of the clamp pawl 73 with the work W. Further, a clamp spring 76 for biasing a spring force of a direction for engaging the engaging pin 74 with the engaging recess 75 is interposed between the clamp rod 72 and the supporting cylinder 71.

An unclamp spring 77 for urging the clamp pawl 73 in a direction for disengaging the engaging state of the clamp pawl 73 with the work W is interposed between the clamp rod 72 and the supporting cylinder 71, and the spring force of the unclamp spring 77 is not set strongly in the degree for disengaging the clamping state by releasing the engaging pin 74 from the engaging recess 75 when the clamp rod 72 is disposed at the clamping position.

An engaging protrusion 78 parallel at both side faces protrudes from the other end of the clamp rod 72 protruding from the back portion of the pallet 7, and the engaging protrusion 78 so protrudes from the clamp rod 72 as to disposed along both side faces in a direction perpendicularly crossing both the attitude converting guide rails 53 and 53 when the clamp rod 72 is disposed in the state for clamping the work W.

Figure 12:
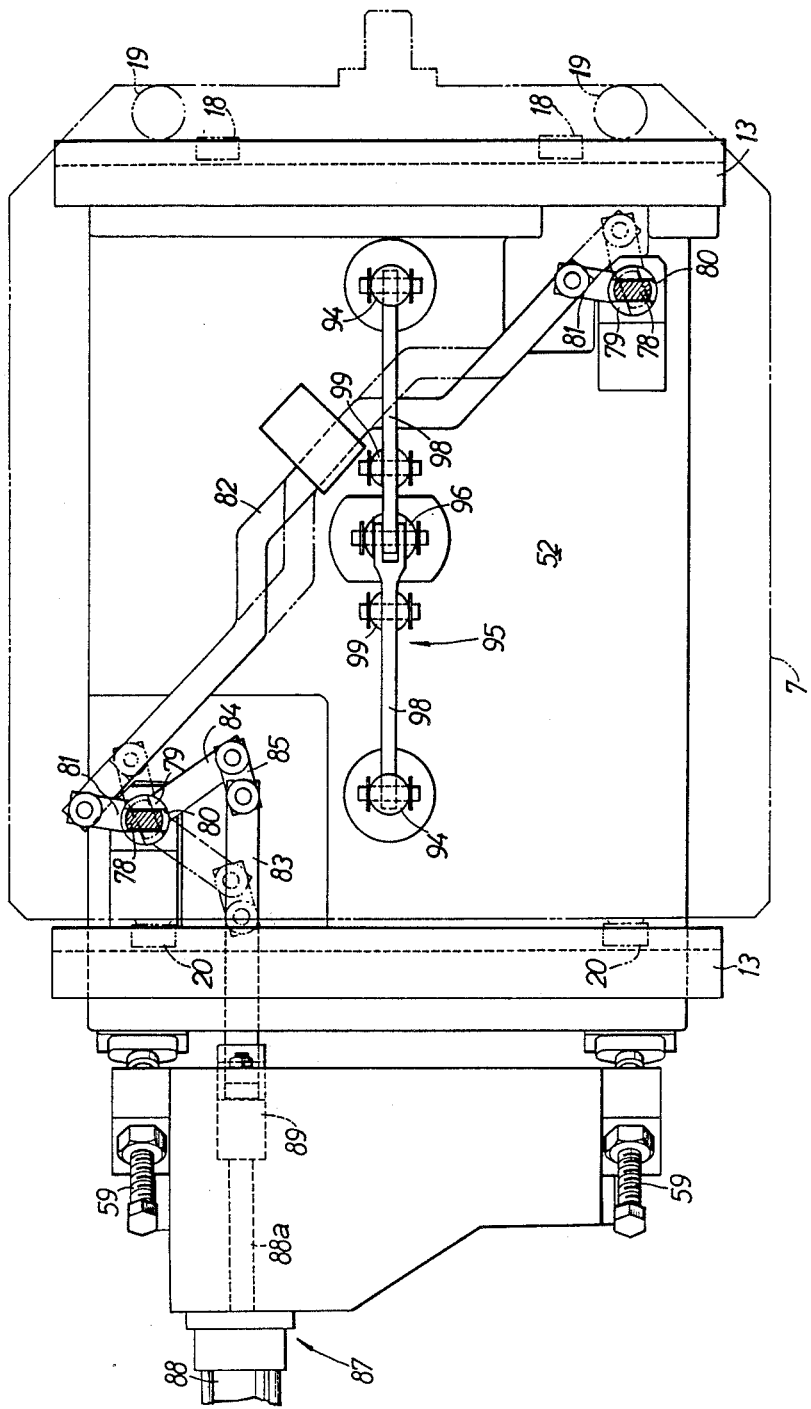
FIG. 12 is a plan view of the supporting base.

Referring to FIG. 12, rotary shafts 79 and 79 are rotatably supported to the positions corresponding to both the clamp rods 72 and 72 on the supporting base 52. Engaging grooves 80 opened at both ends to engage the engaging protrusions 78 are perforated along the radial line of the rotary shaft 79 at the ends of the rotary shafts 79 and 79. Connecting arms 81 and 81 are fixedly secured to both the rotary shafts 79 and 79, the connecting arms 81 and 81 are connected through a connecting link 82, and both the rotary shafts 79 and 79 are hence synchronously rotated.

A shift rod 83 protruding from the supporting base 52 at opposite side from the attitude converting position P₂ is connected to one of both the rotary shafts 79 and 79 when the supporting base 52 is contacted with the horizontal stopper 59 to be in a horizontal attitude. More particularly, the shift rod 83 is so supported to the supporting base 52 as to be longitudinally movable to cross perpendicularly the axis of the rotary shaft 79, and one end of the shift rod 83 is connected to a connecting arm 84 fixedly secured to one rotary shaft 79 through a link 85. Accordingly, the shift rod 83 is longitudinally driven to rotatably drive both the rotary shafts 79 and 79, thereby rotatably driving the clamp rod 72 engaged with the engaging grooves 80 of the rotary shafts 79 and 79 through the engaging protrusion 78.

An engaging recess 86 opened upwardly when the supporting base 52 is contacted with the horizontal stopper 59 to be in a horizontal attitude is formed at the other end of the shift rod 83, and a shift driving source 87 to be engaged with the engaging recess 86 of the shift rod 83 is disposed on a portion corresponding to the attaching and detaching position P$_1$ of the side plates 56 and 56. This shift driving source 87 comprises a cylinder 88 fixedly supported to both the side plates 56 and 56 with an axis parallel to the traveling guide rails 53 and 53, and an engaging member 89 fixedly secured to the end of the piston rod 88a of the cylinder 88, and an engaging recess 90 to be engaged with the engaging recess 86 is formed on the lower portion of the engaging member 89. A guide rod 91 disposed fixedly parallel to the axis of the cylinder 88 is inserted to the engaging member 89, and the engaging member 89 moves longitudinally of the shift rod 83 under the guidance of a guide rod 91 in response to the extending and retracting operations of the cylinder 88. The clamps rods 72 and 27 are synchronously rotatably driven by extending and retracting the cylinder 88 in the state that the engaging recesses 86 and 90 are engaged.

Positioning pins 94 and 94 releasably engaged with the positioning holes 21 and 21 perforated at the pallet 7 are axially movably supported to the supporting base 52, and an actuating rod 86 connected to the positioning pins 94 and 94 through a linkage 95 is axially movably supported to the supporting base 52. The positioning pins 94 and 94 are axially movable between the position to be engaged with the positioning holes 21 and 21 and the position for releasing the connecting state and supported to the supporting base 52, and the positioning pins 94 and 94 are resiliently urged in a direction for engaging them with the positioning holes 21 and 21 by a spring 92 interposed between the supporting base 52 and the positioning pins 94, 94.

The operating rod 96 is axially movably disposed through the supporting base 52 at the center between both the positioning pins 94 and 94, and a roller 97 as a cam follower is rotatably supported to the end of the operating rod 96 protruding from the back portion of the supporting base 52. The linkage 95 has a pair of links 98 and 98 commonly connected at one end to the end of the operating rod 96 protruding from the front surface of the supporting base 52, the other ends of the links 98 and 98 are connected to the positioning pins 94 and 94, and the intermediate portions of the links 98 and 98 are rotatably supported to the brackets 99 and 99 fixedly secured to the supporting base 52. Accordingly, the operating rod 96 is axially driven to axially move both the positioning pins 94 and 94 synchronously.

Figure 13:
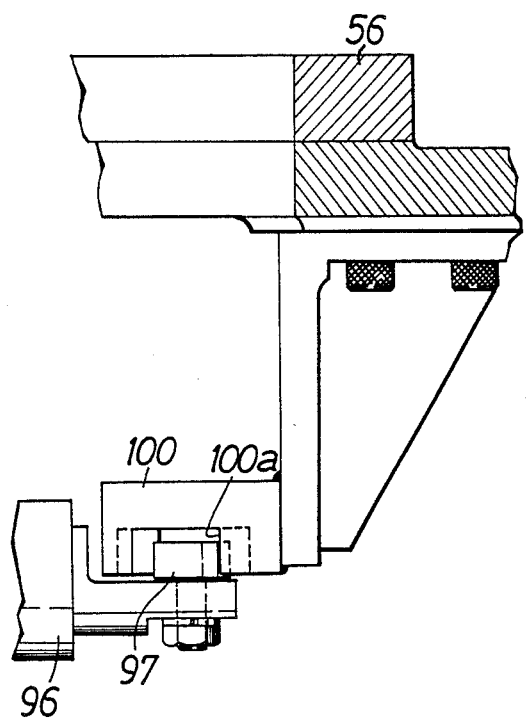
FIG. 13 is an enlarged sectional view taken along a line XIII—XIII of FIG. 7.

Referring to FIG. 13, a cam 100 for axially driving the operating rod 96 by engaging the roller 97 is fixedly secured to both side plates 56 and 56 at the attitude converting position P$_2$. This cam 100 has a cam groove 100a for engaging the roller 97 at the side face, the cam groove 100a engages the roller 97 when the supporting position 52 is moved from the attaching and detaching position P$_1$ to the attitude converting position P$_2$, and is so formed as to axially press the operating rod 96 to release the positioning pins 94 and 94 from the positioning holes 21 and 21.

The operation of the embodiment will be described. In order to sequentially machine the work W by the respective machine tools M$_1$, M$_2$ and M$_3$, the work W is attached on the pallet 7 of horizontal attitude at the attaching and detaching position P$_1$ of the work conveying and delivering unit 2. In other words, the supporting base 52 is disposed in the horizontal attitude at the attaching and detaching position P$_1$, the guide rollers 18, 19 and 20 are engaged with both the movable guide rails 13 and 13 at the supporting base 52, and the pallet 7 for supporting the positioning pins 94 and 94 in engagement with the positioning holes 21 and 21 is also in the horizontal attitude. In this case, the shift rod 83 is pulled by the shift driving source 87 so that both the shift rods 72 and 72 so rotate the engaging pin 74 as to rise from the engaging recess 75 onto the upper end face of the supporting cylinder 71 and then move to the position for releasing the clamping state by the spring force of the unclamp spring 77. Then, the work W is placed on the supporting protrusions 70, and the positioning protrusions 69 are engaged with the work W to position and place the work W on the pallet 7. Then, the shift rod 82 is pressed to drive by the shift driving source 87 to so rotate both the shift rods 72 and 72 as to engage the engaging pin 74 with the engaging recess 75, thereby engaging both the clamp pawls 73 and 73 with the work W. Further, the clamping state is resiliently held by the spring force of the clamp spring 76.

Thus, a pair of clamp rods 72 and 72 are synchronously driven by the operation of the shift driving source 87 at the attaching and detaching position P$_1$ to easily attach the work W to the pallet 7.

After the work W is attached to the pallet 7 on the supporting base 52, the traveling block 54 is traveled along both the traveling guide rails 53 and 53 toward the attitude converting position P$_2$. The supporting base 52 is moved along both the attitude converting guide rails 51 and 51 through the connecting arm 55 by traveling the traveling block 54 to convert the supporting base 52, i.e., the pallet 7 and the work W from the horizontal attitude to the vertical attitude.

Since the supporting base 52 is thus moved along the attitude converting guide rail 51 by the guide rollers 57 and 58 with less rolling resistance, a force required for converting the attitude and moving them may be small enough. Further, the position of the supporting base 52 can be adjusted merely by regulating the axial centers of the guide rollers 57 and 58, thereby facilitating the assembling.

When the supporting base 52 is contacted with the vertical stoppers 60 and 60 to arrive at the attitude converting position P$_2$, the supporting base 52 and hence the pallet 7 and the work W are converted to the vertical attitude. In this case, both the movable guide rails 13 and 13 of the supporting base 52 are connected to the stationary guide rail 12 of the work conveyor 1 to construct the annular guide rails 5 and 6. Further, the roller 97 of the operating rod 96 is engaged with the cam groove 100a of the cam 100 to press the operating rod 96, and both the positioning pins 94 and 94 are released from the positioning holes 21 and 21 of the pallet 7 through the linkage 95. Further, the engaging grooves 80 engaged with the engaging protrusions 78 of both the clamp rods 72 and 72 of the pallet 7 are disposed at the positions along the annular guide rails 5 and 6, and the pallet 7 is hence movable along the annular guide rails 5 and 6.

Further, when the supporting base 52 arrives at the attitude converting position P$_2$, the engaging pin 42 of the pallet 7 is engaged with the engaging portion of the index arm 8 of the work conveyor 1. Accordingly, the pallet 7 and the work W are transferred from the work conveying and delivering unit 2 to the work conveyor 1 in response to the rotation of the index arm 8 to move along the annular guide rails 5 and 6.

The pallet 7 and the work W transferred to the work conveyor 1 are sequentially conveyed to the releasing stations S$_{R1}$, S$_{R2}$ and S$_{R3}$ in response to the angular displacement of a predetermined angle, for example, 90° of the index arm 8. In the releasing stations $S_{R1}$, $S_{R2}$ and $S_{R3}$, the hydraulic pressure is supplied to the hydraulic pressure chambers 33 of the cylinders 23 and 23 to engage the positioning pins 22 and 22 with the positioning holes 21 and 21 of the pallet 7.

Then, the slide unit 10, i.e., the pallet 7 and the work W can be moved from the releasing stations $S_{R1}$, $S_{R2}$ and $S_{R3}$ to the machining stations $S_{M1}$, $S_{M2}$ and $S_{M3}$ by the extending operation of the unit feeding cylinder 37 subsequently to the extending operation of the shift cylinder 35. In this case, when it is necessary to reverse the attitudes of the pallet 7 and the work W according to the machining position of the work W, the shift cylinder 35 is extended to operate the rotary driving motor 24 when both the movable guide rails 13 and 13 of the pallet supporting plate 17 are released from the stationary guide rail 12 to reverse the pallet 7 and the work W. Then, the pallet 7 and the work W of the state reversed by the extending operation of the unit feeding cylinder 37 are brought to the machining stations $S_{M1}$, $S_{M2}$ and $S_{M3}$.

Thus, the slide unit 10 between the releasing stations $S_{R1}$, $S_{R2}$ and $S_{R3}$ and the machining stations $S_{M1}$, $S_{M2}$ and $S_{M3}$ is moved by two stages by the shift cylinder 35 and the unit feeding cylinder 37 to temporarily accurately determine the stopping position merely by operating the cylinders 35 and 37 at the maximum limit only when it is necessary to temporarily stop the pallet 7 and the work W on the way of the slide unit 10 to reverse them. On the other hand, when the slide unit 10 is fed by only one cylinder, it is difficult to accurately determine the temporarily stopping position due to the inertial force with the fluid pressure.

After the machining of the machine tools M, $M_2$ and $M_3$ are finished in the machining stations $S_{M1}$, $S_{M2}$ and $S_{M3}$, the pallet 7 and the work W are returned to the original releasing positions $S_{R1}$, $S_{R2}$ and $S_{R3}$ by the shift cylinder 35 and the unit feeding cylinder 37, and the conveying is restarted along the annular guide rails 5 and 6 by the index arm 8.

Thus, when the machining is finished by the machine tools $M_1$, $M_2$ and $M_3$ and the work is returned to the conveying and delivering station $S_C$, the pallet 7 rides on both the movable guide rails 13 and 13 of the supporting base 52 stood by at the conveying and delivering station $S_C$, i.e, at the attitude converting position $P_2$, and the engaging protrusion 78 of the clamp rod 72 is engaged with the engaging groove 80 of the rotary shaft 79 of the supporting base 52.

Then, when the traveling block 54 of the work conveying and delivering unit 2 is traveled to the attaching and detaching position $P_1$, the supporting base 52 is moved while converting its attitude from the vertical attitude to the horizontal attitude along both the attitude converting guide rails 51 and 51 to the attaching and detaching position $P_1$. In this case, the positioning pins 94 and 94 are engaged with the positioning holes 21 and 21 of the pallet 7 by the spring force of the spring 92 in response to the release of the roller 97 from the cam groove 100a.

When the supporting base 52 arrives at the attaching and detaching position $P_1$ in contact with the stopper 59, the engaging recess 86 of the shift rod 83 is engaged with the engaging recess 90 of the shift driving source 87. Then, the shift driving source 87 is operated to rotate the clamp pawls 73 and 73 synchronously toward the clamp releasing side, to then remove the machined work W form the pallet 7, thereby newly attaching the work W to be machined on the pallet 7.

In the embodiment described above, the pallet 7 and the work W are sequentially conveyed to the releasing stations $S_{R1}$, $S_{R2}$ and $S_{R3}$ for angular displacement of 90° in the work conveyor 1. However, the invention is not limited to the particular embodiment. For example, the engaging portion 41 engaged with the pallet 7 may be disposed at positions at an interval of 45° along the circumferential direction of the index arm 8 to switch the index arm 8 to the angular displacements of 45° and 90° to be driven. Thus, two types of works W can be machined.

What is claimed is:

1. A work supplying system for supplying work pieces to machine tools, said work supplying system comprising a work piece conveyor for sequentially conveying a work piece attached to a pallet to a plurality of machine tools disposed around an imaginary center line at intervals in a circumferential direction, and a work piece conveying and delivery unit for conveying said work piece to said work piece conveyor and delivery said work piece from said work piece conveyor, wherein a conveying and delivering station for conveying and delivering said work piece attached to said pallet, and a plurality of releasable stations are disposed around said imaginary circle which has a center on said imaginary center line, said releasable stations corresponding, respectively, to machining stations corresponding to machine tools for machining said work piece, and being located on linear lines connecting said imaginary center line to said respective machining stations, said work conveyor comprising a post stand with an axis thereof aligned with said imaginary center line, slide units each reciprocatively movable between an associated of said releasable and machining stations, a plurality of stationary guide rails extending in circular-arc shape along said imaginary circle at portions of said imaginary circle except portions at said conveying and delivering station and said releasable stations, movable guide rails disposed on said slide units and extending in a circular-arc shape at portions corresponding to said conveying and delivering station and said respective releasable stations and connectible to said stationary guide rails to form, cooperatively with said stationary guide rails, annular guide rails for guiding an angular displacement of said pallet around said post, an index arm supported on said post and angularly displaceably for releasable connection to a pallet on said annular guide rails, guide rods laid on stationary bases for guiding said slide units disposed between the associated releasing station and machining station, a pallet supporting plate having said movable guide rails and supported rotatably on said each of said slide units around an axis parallel to said guide rods, and a rotation driving motor for rotatably driving said pallet supporting plate.

2. A work supplying system according to claim 1, wherein said annular guide rails comprise a plurality of sets of pairs of upper and lower stationary guide rails, and a plurality of sets of pairs of upper and lower movable guide rails, two sets of pairs of upper and lower guide rollers rollable on said upper and lower annular guide rails and supported on said pallet at a circumferential interval, and a plurality of positioning pins detachably fitted in said pallet and axially movably on said pallet supporting plate.

3. A work supplying system according to claim 1 or 2, wherein a hollow rotation driving shaft, rotatably supported on said each of said slide units and connected to said rotation driving motor is fixedly secured to the center of said pallet supporting plate, and a fluid pressure supply conduit is arranged in said rotation driving shaft and is connected to a cylinder attached to said pallet supporting plate for axially driving said positioning pin.

4. A work supplying system according to claim 1, wherein a shift cylinder, having an axis parallel to said guide rod is fixedly disposed on said stationary base, a piston rod of said shift cylinder is connected through a link to a unit feeding cylinder substantially parallel to said shift cylinder, and a piston rod of said unit feeding cylinder is connected to said each of said slide units.

5. A work supplying system for supplying work pieces to machine tools, said work supplying system comprising a work piece conveyor for sequentially conveying a work piece attached to a pallet to a plurality of machine tools disposed around an imaginary center line at intervals in a circumferential direction, and a work piece conveying and delivering unit for conveying said work piece to said work piece conveyor and delivering said work piece from said work piece conveyor, wherein a conveying and delivery station for conveying and deliver said work piece attached to said pallet, and a plurality of releasable stations are disposed around said imaginary center line at circumferentially equal intervals along an imaginary circle which has a center on said imaginary center line, said releasable stations corresponding, respectively, to machining stations corresponding to machine tools for machining said work piece, and being located on linear lines connecting said imaginary center line to said respective machining stations, said work conveyor comprising a post stand with an axis thereof aligned with said imaginary center line, slide units each reciprocatively movable between an associated of said releasable and machining stations, a plurality of stationary guide rails extending in circular-arc shape along said imaginary circle at portions of said imaginary circle except portions at staid conveying and delivering station and said releasable stations, movable guide rails disposed on said slide units and extending in a circular-arc shape at portions corresponding to said conveying and delivering station and said respective releasable stations and connectible to said stationary guide rails to form, cooperatively with said stationary guide rails, annular guide rails for guiding an angular displacement of said pallet around said post, and an index arm supported on said post and angularly displaceably for releasable connection to a pallet on said annular guide rails, said work conveying and delivering unit comprising a pair of right and left attitude converting guide rails fixedly disposed to extend in a circular-arc shape between an attitude converting position set corresponding to the work machining position of each machine tool in said conveying and delivering station and an attaching and detaching position set externally at a predetermined interval from said attitude converting position in a radial direction of said post, a supporting base movable along said attitude converting guide rails for supporting a pallet from its back portion, a traveling guide rail attached horizontally between said attitude converting guide rails, a traveling block travellable along said traveling guide rail, and a connecting arm for connecting the traveling block to the supporting base to move said supporting base along said attitude converting guide rails upon traveling of said traveling block.

6. A work supplying system according to claim 5, wherein a plurality of sets of three guide rollers, supported on said supporting base at a position for holding said attitude converting guide rails from above and below and at a position slidably contacting with an outer face of said attitude converting guide rails.

7. A work supplying system according to claim 5 or 6, wherein a movable guide rail for connection to said stationary guide rail of said work conveyor at said attitude converting position is provided at said supporting base, and said pallet is movably supported on said movable guide rail.

8. A work supplying system according to claim 5, wherein said traveling guide rail comprises a pair of right and left guide rails, an endless chain engaged with a driving sprocket connected to said driving motor and a driven sprocket is travellably disposed between both said guide rails, and said chain is engaged with said traveling block.

9. A work supplying system according to claim 5, wherein a stopper abuttable against said supporting base for defining a height corresponding to a vertical state of said pallet and to work machining position in said machine tool is disposed at an end of said attitude converting guide rail close to said attitude converting position, and a horizontal stopper abuttable against said supporting base for defining a horizontal attitude of said pallet is disposed at an end of said attitude converting guide rail close to the attaching and detaching position.

10. A work supplying system according to claim 5, wherein a plurality of positioning pins detachably fitted in said pallet are disposed on said supporting base, an operating rod connected to said positioning pins through a linkage is axially movably supported, a cam follower is provided at the fore end of said operating rod, and a cam fitted in said cam follower for moving said operating rod in a direction for releasing the engaging state of said positioning pin with said pallet is fixedly disposed at said attitude converting position.

11. A work supplying system according to claim 5, wherein a plurality of clamp rods having at one ends thereof pawls for engaging with the work piece are supported to said pallet in a manner rotatable between the state for engaging said clamp pawls with said work piece and the state for releasing the engagement thereof, a plurality of rotary shafts for engaging the other ends of said clamp rods are supported rotatably around the same axis as that of said clamp rod, said rotary shafts are connected with each other for synchronous rotation through a connecting link, a shift rod is provided and connected at one end thereof to one of said rotary shafts for rotating said rotary shafts in response to an axial movement of the shift rod, and a shift driving source is fixedly disposed at said attaching and detaching position for engaging with the other end of said shift rod when said supporting base is located at said attaching and detaching position.

12. A work supplying system according to claim 11, wherein a clamp spring for generating a resilient force in a direction for engaging said clamp pawl with said work piece is interposed between said pallet and said clamp rod.

13. A work supplying system according to claim 11, wherein said rotary shaft is provided with an engaging groove opened at both ends thereof along the conveying direction of said work piece conveyor to be engaged by said clamp rod in a state of said clamp pawl being engaged with said work piece.

* * * * *